US009726566B2

(12) United States Patent
Dorr

(10) Patent No.: US 9,726,566 B2
(45) Date of Patent: Aug. 8, 2017

(54) VACUUM PRESSURE GAUGE

(71) Applicant: Honeywell International Inc., Morristown, NJ (US)

(72) Inventor: Joshua Dorr, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 113 days.

(21) Appl. No.: 14/699,409

(22) Filed: Apr. 29, 2015

(65) Prior Publication Data
US 2016/0320259 A1    Nov. 3, 2016

(51) Int. Cl.
*G01L 21/30* (2006.01)
*G01L 19/06* (2006.01)
*G01L 21/36* (2006.01)

(52) U.S. Cl.
CPC .......... *G01L 21/30* (2013.01); *G01L 19/0636* (2013.01); *G01L 21/36* (2013.01)

(58) Field of Classification Search
None
See application file for complete search history.

(56) References Cited

U.S. PATENT DOCUMENTS 5,191,799 A * 3/1993 Schoroth ................. G01L 21/34
324/460
5,578,760 A * 11/1996 Suzuki ................ G01L 19/0645
73/706

FOREIGN PATENT DOCUMENTS

WO    2009085165    7/2009
WO    2010033427    3/2010

OTHER PUBLICATIONS

Search Report from related European application 16166087.3 dated Sep. 16, 2016 (7 pages).
G. Gabrielse, et al. Thousandfold Improvement in the Measured Anitproton Mass. Physical Review Letters, Sep. 10, 1990, pp. 1317-1320, vol. 65, No. 11, 1990 The American Physical Society.

* cited by examiner

*Primary Examiner* — Andre Allen
(74) *Attorney, Agent, or Firm* — Brooks, Cameron & Huebsch, PLLC

(57) ABSTRACT

A vacuum pressure gauge is described herein. One apparatus includes an ion trap configured to trap antimatter therein in a vacuum chamber, and a controller configured to determine a lifetime of the antimatter trapped in the ion trap and determine a pressure in the vacuum chamber based, at least in part, on the determined lifetime of the antimatter.

19 Claims, 3 Drawing Sheets

VACUUM PRESSURE GAUGE

TECHNICAL FIELD

The present disclosure relates to a vacuum pressure gauge.

BACKGROUND

There are many different types of pressure gauges that can be used to determine (e.g., measure and/or calculate) the pressure in many different types of environments. For example, a vacuum pressure gauge may be used to determine the pressure in a vacuum chamber.

Previous vacuum pressure gauges, however, may only work within a certain pressure range. That is, if the pressure in the vacuum chamber is outside of the range, the gauge may not be able to accurately determine the pressure. For example, previous vacuum pressure gauges may only work down to a pressure of about $10^{-12}$ or $10^{-13}$ torr. That is, previous pressure gauges may not be able to accurately determine the pressure in a vacuum chamber if the pressure in the vacuum chamber is less than $10^{-12}$ or $10^{-13}$ torr.

DETAILED DESCRIPTION

Figure 1:
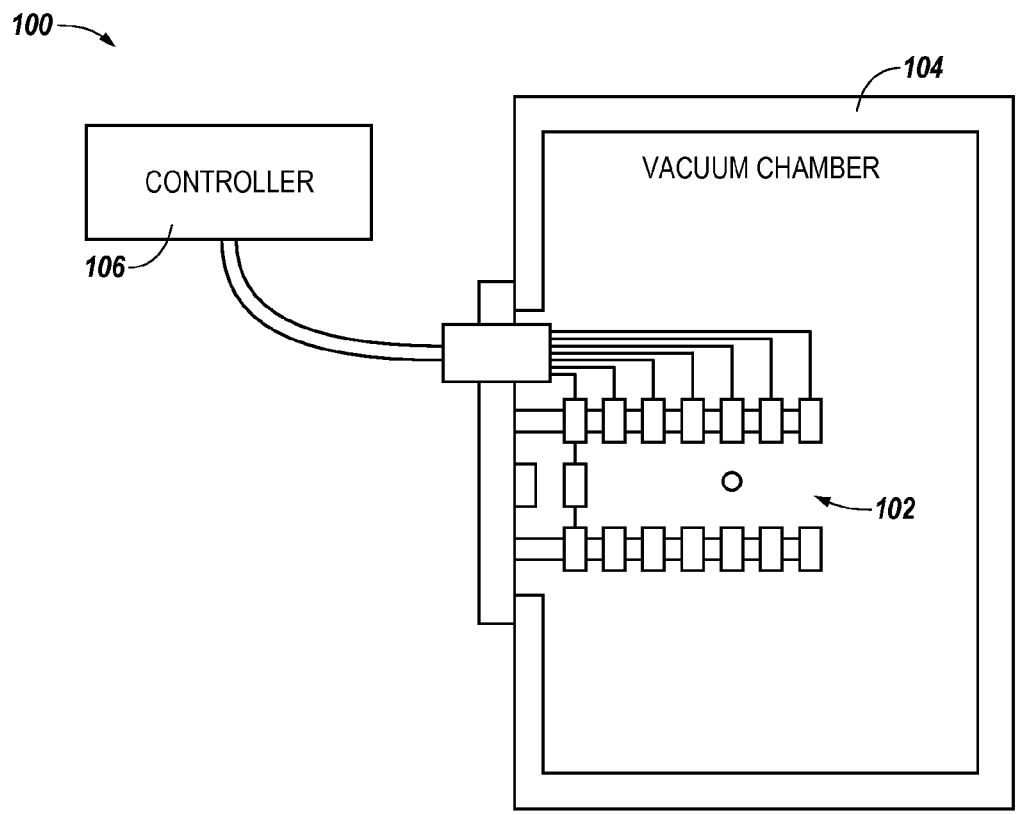
FIG. 1 illustrates a vacuum pressure gauge in accordance with one or more embodiments of the present disclosure.

A vacuum pressure gauge is described herein. For example, one or more embodiments include an ion trap configured to trap antimatter therein in a vacuum chamber, and a controller configured to determine a lifetime of the antimatter trapped in the ion trap and determine a pressure in the vacuum chamber based, at least in part, on the determined lifetime of the antimatter.

A vacuum pressure gauge in accordance with the present disclosure can have (e.g., work within) a greater pressure range than previous vacuum pressure gauge. For example, a vacuum pressure gauge in accordance with the present disclosure may be able to work at extremely low pressures (e.g., pressures less than $10^{-12}$ or $10^{-13}$ torr). That is, a vacuum pressure gauge in accordance with the present disclosure may be able to accurately determine the pressure in a vacuum chamber if the pressure in the vacuum chamber is extremely low (e.g., less than $10^{-12}$ or $10^{-13}$ torr).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be references as 202 in FIG. 2.

As used herein, "a" or "a number of" something can refer to one or more such things. For example, "a number of ions" can refer to one or more ions. Additionally, the designator "N" as used herein, particularly with respect to reference numerals in the drawings, indicates that a number of the particular feature so designated can be included with a number of embodiments of the present disclosure.

FIG. 1 illustrates a vacuum pressure gauge 100 in accordance with one or more embodiments of the present disclosure. Vacuum pressure gauge 100 can be used to determine (e.g., measure and/or calculate) the pressure in a vacuum chamber, such as vacuum chamber 104 illustrated in FIG. 1.

As shown in FIG. 1, vacuum pressure gauge 100 can include an ion trap 102, which can be inserted into and sealed (e.g. hermetically sealed) in vacuum chamber 104. While in vacuum chamber 104, ion trap 102 can trap antimatter (e.g., antimatter ions) therein. For example, ion trap 102 can trap a number of positrons therein.

Ion trap 102 can be, for example, a Penning trap (e.g., an open endcap Penning trap). Ion trap 102, and the process of trapping antimatter therein, will be further described herein (e.g., in connection with FIG. 2).

As shown in FIG. 1, vacuum pressure gauge 100 can include a controller 106 outside of vacuum chamber 104 and coupled to ion trap 102. Controller 106 can be, for example, an electronic controller that is electronically connected to ion trap 102 via a number of wires, as will be further described herein (e.g., in connection with FIG. 2).

Although not shown in FIG. 1 for simplicity and so as not to obscure embodiments of the present disclosure, controller 106 can include a memory and a processor. The memory can be any type of storage medium that can be accessed by the processor to perform various examples of the present disclosure. For example, the memory can be a non-transitory computer readable medium having computer readable instructions (e.g., computer program instructions) stored thereon that are executable by the processor to determine the pressure in vacuum chamber 104 in accordance with the present disclosure. That is, the processor can execute the executable instructions stored in the memory to determine, the pressure in vacuum chamber 104 in accordance with the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

As an example, controller 106 can determine (e.g., measure) the lifetime of the antimatter trapped in ion trap 102, and determine (e.g., calculate) the pressure in vacuum chamber 104 based, at least in part, on the determined lifetime of the trapped antimatter. That is, the pressure in vacuum chamber 104 can be related to, and therefore determined based on, the lifetime of the antimatter trapped in ion trap 102. For instance, there may be a linear relationship between the lifetime of the antimatter trapped in ion trap 102 and the pressure in vacuum chamber 104. Because the lifetime of the trapped antimatter may be relatively long at extremely low pressures, (e.g., pressures less than $10^{-12}$ or $10^{-13}$ torr), the lifetime may be an accurate indicator of the pressure in vacuum chamber 104 at extremely low pressures.

For instance, controller 106 can determine the quantity (e.g., amount) of particles in the vacuum chamber based, at least in part, on the determined lifetime of the trapped antimatter, and then determine the pressure in vacuum chamber 104 based, at least in part, on the determined quantity of particles. That is, the pressure in vacuum chamber 104 can be related to (e.g., directly proportional to) the quantity of particles in the vacuum chamber, and the quantity of particles in the vacuum chamber can be determined based on the lifetime of the trapped antimatter.

The lifetime of the antimatter trapped in ion trap 102 can correspond to the annihilation rate of the antimatter trapped in the ion trap. That is, the lifetime of the antimatter trapped in ion trap 102 can correspond to the amount of time before the trapped antimatter is annihilated by the particles in vacuum chamber 104 (e.g., the amount of time the antimatter remains trapped in ion trap 102 before the particles in vacuum chamber 104 collide with the trapped antimatter). As the particles in vacuum chamber 104 collide with the antimatter trapped in ion trap 102, the antimatter will annihilate and reduce the quantity of antimatter ions trapped in ion trap 102. Hence, the lifetime of the antimatter trapped in ion trap 102 can be inversely proportional to the quantity of particles in vacuum chamber 104 (e.g., the more particles in the chamber, the shorter the lifetime of the trapped antimatter).

Controller 106 can determine the annihilation rate of the antimatter trapped in ion trap 102, and therefore the lifetime of the trapped antimatter, by measuring the quantity of antimatter ions trapped in the trap versus time. For example, controller 106 can determine the annihilation rate of the antimatter trapped in ion trap 102 by determining (e.g., measuring and/or counting) the quantity of antimatter ions trapped in the trap at an initial time, and determining (e.g., measuring and/or counting) the quantity of antimatter ions trapped in the trap at a subsequent time. The difference between the two quantities can correspond to the amount of antimatter ions that have been annihilated in that time, which can be used to determine the annihilation rate.

Controller 106 can determine (e.g., measure) the quantity of antimatter ions trapped in ion trap 102 by amplifying the electronic signal induced in the trap (e.g., in the electrodes in the trap, as described in connection with FIG. 2) by the trapped antimatter, and determining (e.g., measuring) the frequency bandwidth (e.g., the width in frequency space) of the amplified electronic signal, which may be proportional to the quantity of antimatter ions trapped in the trap, as will be understood by those of skill in the art. Hence, controller 106 can determine (e.g., calculate) the annihilation rate, and therefore the lifetime, of the antimatter trapped in ion trap 102, based on (e.g., by measuring and/or monitoring) the frequency bandwidth of the amplified signal. Controller 106 can amplify the electronic signal induced in trap by the trapped antimatter using an amplifier.

Figure 2:
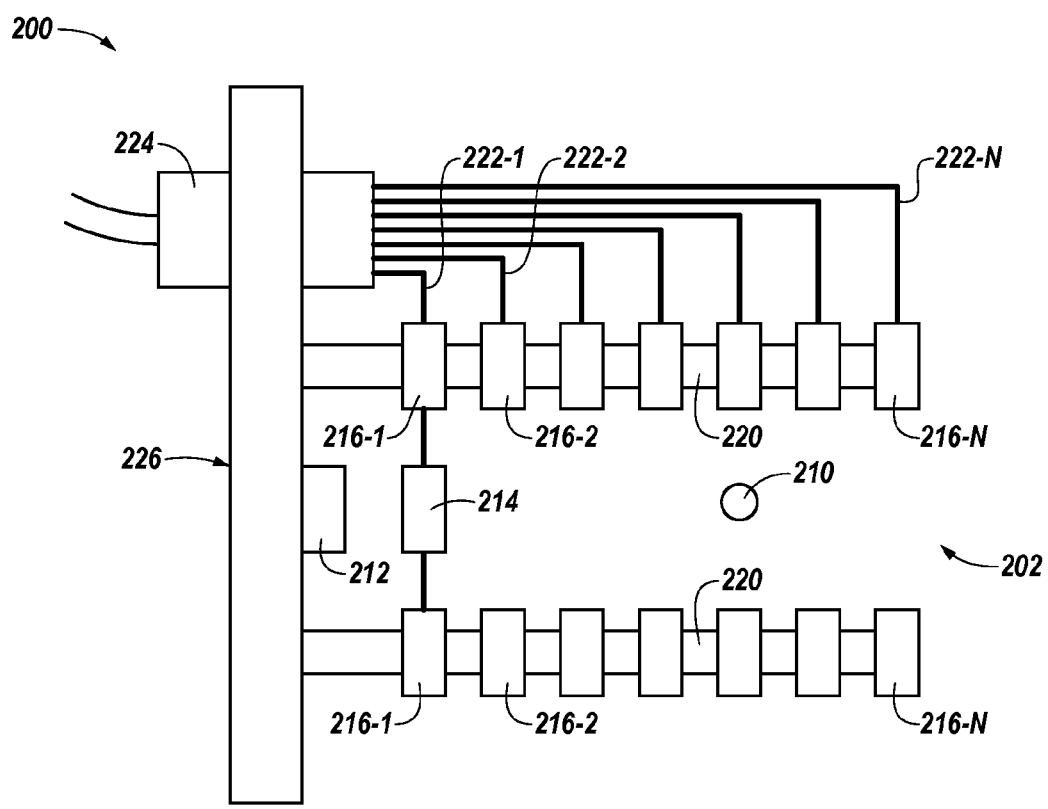
FIG. 2 illustrates a cross-sectional view of a portion of a vacuum pressure gauge in accordance with one or more embodiments of the present disclosure.

FIG. 2 illustrates a cross-sectional view of a portion of a vacuum pressure gauge 200 in accordance with one or more embodiments of the present disclosure. Vacuum pressure gauge 200 can be, for example, vacuum pressure gauge 100 previously described in connection with FIG. 1, and the portion of the vacuum pressure gauge illustrated in FIG. 2 can be the portion of the gauge in vacuum chamber 104 illustrated in FIG. 1.

As shown in FIG. 2, vacuum pressure gauge 200 can include an ion trap 202. Ion trap 202 can be, for example, ion trap 102 previously described in connection with FIG. 1. For instance, ion trap 202 can be a Penning trap (e.g., an open endcap Penning trap) that can trap antimatter (e.g., antimatter ions) therein. In the example illustrated in FIG. 2, a single antimatter ion 210 is trapped in ion trap 202. However, embodiments of the present disclosure are not so limited; ion trap 202 can trap any number of antimatter ions therein. For example, ion 210 illustrated in FIG. 2 could represent a plurality (e.g., a cloud) of antimatter ions.

As shown in FIG. 2, ion trap 202 can include a number of electrodes (e.g., ring electrodes, end cap electrodes, compensation electrodes, etc.) 216-1, 216-2, ..., 216-N. Each electrode 216-1, 216-2, ..., 216-N can be separated by a different portion of an insulating spacer 220 (e.g., a first portion of insulating spacer 220 can be between electrode 216-1 and electrode 216-2, a second portion of insulating spacer 220 can be between electrode 216-2 and the next electrode, etc.), as illustrated in FIG. 2.

Electrodes 216-1, 216-2, ..., 216-N can form an accumulation region of ion trap 202 in which the antimatter (e.g., antimatter ion 210) can be trapped, as illustrated in FIG. 2. For example, one of electrodes 216-1, 216-2, ..., 216-N can be a permanent magnet that can provide a magnetic field which forms the magnetic field component of the Penning trap.

As shown in FIG. 2, each electrode 216-1, 216-2, ..., 216-N can be coupled to a different signal wire 222-1, 222-2, ..., 222-N (e.g., electrode 216-1 can be coupled to signal wire 222-1, electrode 216-2 can be coupled to signal wire 222-2, etc.). Each signal wire 222-1, 222-2, ..., 222-N can be coupled to a controller located outside of the vacuum chamber (e.g., controller 106 previously described in connection with FIG. 1) via electronics feedthrough 224. For instance, each signal wire 222-1, 222-2, ..., 222-N can be bundled by, and enter and exit the vacuum chamber through, electronics feedthrough 224. The controller can apply voltages to electrodes 216-1, 216-2, ..., 216-N via signal wires 222-1, 222-2, ..., 222-N to load and trap antimatter in ion trap 202.

As shown in FIG. 2, vacuum pressure gauge 200 can include a positron source 212 and a tungsten moderator 214. Positron source 212 can be, for example, a radioactive positron source, such as a sodium-22 positron source. Tungsten moderator 214 can be, for example, a single crystal tungsten moderator.

Positron source 212 can load antimatter (e.g., positrons) into ion trap 202 through tungsten moderator 214. For example, during the loading, positrons from positron source 212 can pass through moderator 214, form positronium, and become ionized in ion trap 202.

Upon the antimatter being loaded into ion trap 202, the antimatter can be trapped in the ion trap. For example, during the trapping, the controller can prevent (e.g., block) positron source 212 from loading additional antimatter into ion trap 202 by biasing tungsten moderator 214 with a large potential voltage, while applying a potential voltage to electrodes 216-1, 216-2, . . . , 216-N to trap the loaded antimatter in ion trap 202. Once the antimatter has been trapped in ion trap 202, the controller can begin the process to determine the lifetime of the antimatter and the pressure in the vacuum chamber, as previously described herein (e.g., in connection with FIG. 1).

As shown in FIG. 2, vacuum pressure gauge 200 can include a vacuum flange 226 connected to ion trap 202 (e.g., through an insulating spacer 220) and positron source 212. Vacuum flange 226 can be inserted into the vacuum chamber in order to insert and seal (e.g., hermetically seal) ion trap 202 in the vacuum chamber. Further, electronics feedthrough 224 can be included within vacuum flange 226 such that wires 222-1, 222-2, . . . , 222-N can enter and exit the vacuum chamber, as illustrated in FIG. 2.

Figure 3:
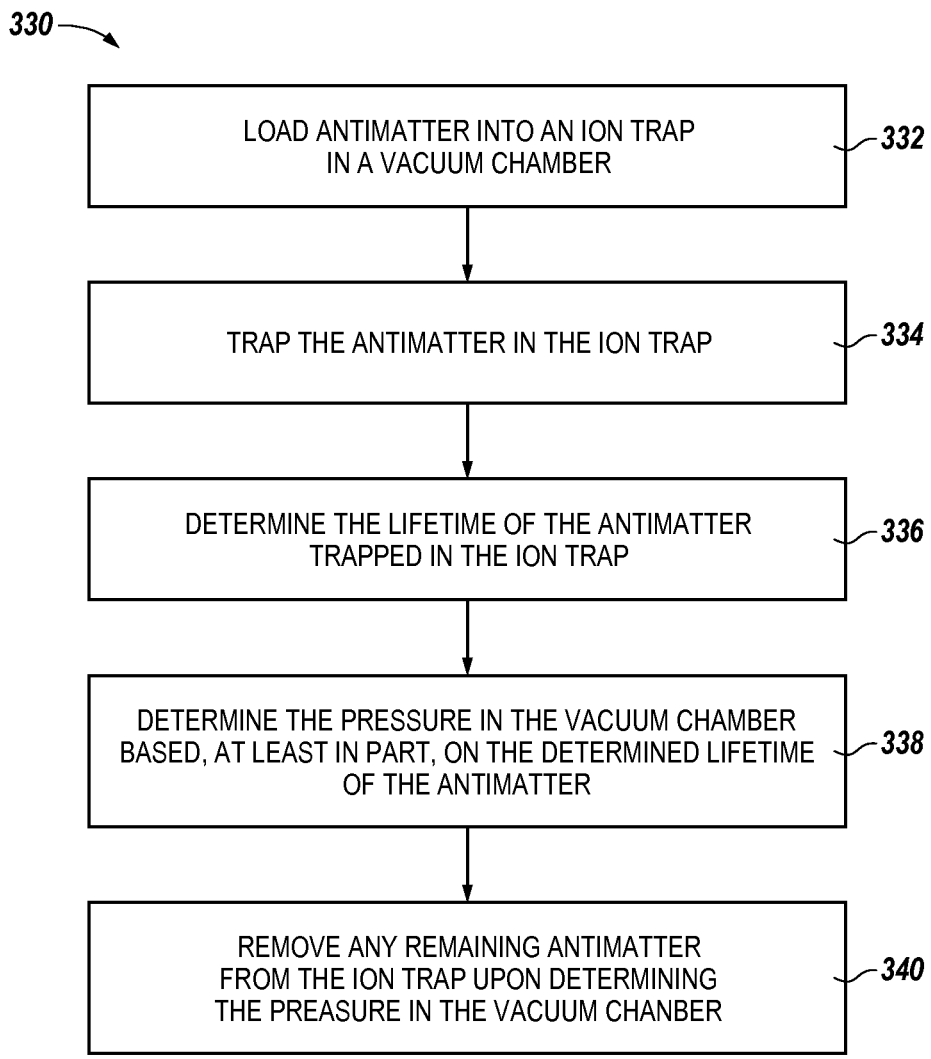
FIG. 3 illustrates a flow chart of a method of determining pressure in a vacuum chamber in accordance with one or more embodiments of the present disclosure.

FIG. 3 illustrates a flow chart of a method 330 of determining pressure in a vacuum chamber in accordance with one or more embodiments of the present disclosure. The vacuum chamber can be, for example, vacuum chamber 104 previously described in connection with FIG. 1. Method 330 can be performed by, for example, vacuum pressure gauge 100 and 200 previously described in connection with FIGS. 1 and 2, respectively.

At block 332, method 330 includes loading antimatter (e.g., positrons) into an ion trap in the vacuum chamber. The ion trap can be, for example, ion trap 102 and 202 previously described in connection with FIGS. 1 and 2, respectively. The antimatter can be loaded into the ion trap from a positron source and through a tungsten moderator, as previously described herein (e.g., in connection with FIG. 2).

At block 334, method 330 includes trapping the antimatter in the ion trap. The antimatter can be trapped in the ion trap by, for example, biasing the tungsten moderator with a large potential voltage while applying a potential voltage to the electrodes of the ion trap, as previously described herein (e.g., in connection with FIG. 2).

At block 336, method 330 includes determining the lifetime of the antimatter trapped in the ion trap. The lifetime of the trapped antimatter can be determined by, for example, controller 106 previously described in connection with FIG. 1. The lifetime of the trapped antimatter can correspond to the annihilation rate of the trapped antimatter, as previously described herein (e.g., in connection with FIG. 1).

At block 338, method 330 includes determining the pressure in the vacuum chamber based, at least in part, on the determined lifetime of the antimatter. The pressure can be determined by, for example, controller 106, and can be related to the quantity of particles in the vacuum chamber, as previously described herein (e.g., in connection with FIG. 1).

At block 340, method 330 includes removing (e.g., dumping) any remaining antimatter from the ion trap upon determining the pressure in the vacuum chamber. The remaining antimatter may be, for example, any antimatter that may not have been annihilated during the process of determining the pressure in the vacuum chamber. Upon removing the remaining antimatter from the ion trap, method 330 can be repeated (e.g., return to block 332).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A vacuum pressure gauge, comprising:
   an ion trap configured to trap antimatter therein in a vacuum chamber; and
   a controller configured to:
      determine a lifetime of the antimatter trapped in the ion trap; and
      determine a pressure in the vacuum chamber based, at least in part, on the determined lifetime of the antimatter.

2. The vacuum pressure gauge of claim 1, wherein the lifetime of the antimatter trapped in the ion trap corresponds to an annihilation rate of the antimatter trapped in the ion trap.

3. The vacuum pressure gauge of claim 2, wherein the controller is configured to determine the annihilation rate of the antimatter trapped in the ion trap by:
   determining a quantity of antimatter ions trapped in the ion trap at an initial time; and
   determining a quantity of antimatter ions trapped in the ion trap at a subsequent time.

4. The vacuum pressure gauge of claim 1, wherein the pressure gauge includes a positron source configured to load the antimatter into the ion trap.

5. The vacuum pressure gauge of claim 4, wherein the pressure gauge includes a tungsten moderator through which the positron source is configured to load the antimatter into the ion trap.

6. The vacuum pressure gauge of claim 4, wherein the controller is configured to, upon the antimatter being loaded into the ion trap:
   prevent the positron source from loading additional antimatter into the ion trap; and
   apply a voltage to the ion trap to trap the antimatter in the ion trap.

7. The vacuum pressure gauge of claim 1, wherein the controller is configured to determine the pressure in the vacuum chamber based on a linear relationship between the lifetime of the antimatter and the pressure in the vacuum chamber.

8. A method of determining pressure in a vacuum chamber, comprising:

determining, by a controller of a vacuum pressure gauge, a lifetime of antimatter trapped in an ion trap in a vacuum chamber; and determining, by the controller, a pressure in the vacuum chamber based, at least in part, on the determined lifetime of the antimatter.

9. The method of claim 8, wherein determining the pressure in the vacuum chamber includes:

determining a quantity of particles in the vacuum chamber based on the determined lifetime of the antimatter; and determining the pressure in the vacuum chamber based on the determined quantity of particles.

10. The method of claim 8, wherein determining the lifetime of the antimatter trapped in the ion trap includes:

amplifying an electronic signal induced in the ion trap by the antimatter; and determining a quantity of antimatter ions trapped in the ion trap based on a frequency bandwidth of the amplified electronic signal.

11. The method of claim 10, wherein the frequency bandwidth of the amplified electronic signal is proportional to the quantity of antimatter ions trapped in the ion trap.

12. The method of claim 10, wherein the method includes amplifying the electronic signal induced in the ion trap using an amplifier of a vacuum pressure gauge.

13. The method of claim 8, wherein the method includes removing any remaining antimatter from the ion trap upon determining the pressure in the vacuum chamber.

14. A vacuum pressure gauge, comprising:

an ion trap configured to trap antimatter therein in a vacuum chamber; and a controller configured to:

determine a lifetime of the antimatter trapped in the ion trap;

determine a quantity of particles in the vacuum chamber based, at least in part, on the determined lifetime of the antimatter; and determine a pressure in the vacuum chamber based, at least in part, on the determined quantity of particles.

15. The vacuum pressure gauge of claim 14, wherein the lifetime of the antimatter trapped in the ion trap corresponds to an amount of time before the antimatter trapped in the ion trap is annihilated by the particles in the vacuum chamber.

16. The vacuum pressure gauge of claim 14, wherein the lifetime of the antimatter trapped in the ion trap is inversely proportional to the quantity of particles in the vacuum chamber.

17. The vacuum pressure gauge of claim 14, wherein the antimatter trapped in the ion trap includes a number of positrons.

18. The vacuum pressure gauge of claim 14, wherein the ion trap is a Penning trap.

19. The vacuum pressure gauge of claim 14, wherein the vacuum pressure gauge includes a vacuum flange connected to the ion trap and inserted into the vacuum chamber.

* * * * *